United States Patent [19]

Nilssen

[11] Patent Number: 4,956,581

[45] Date of Patent: Sep. 11, 1990

[54] FLYBACK CONVERTER MICROWAVE OVEN POWER SUPPLY

[76] Inventor: Ole K. Nilssen, Caesar Dr., Rte. 5, Barrington, Ill. 60010

[21] Appl. No.: 366,269

[22] Filed: Jun. 12, 1989

Related U.S. Application Data

[63] Continuation of Ser. No. 808,286, Dec. 12, 1985, abandoned.

[51] Int. Cl.[5] ..................... H05B 39/00; H05B 41/14; H05B 6/64; H02M 3/335

[52] U.S. Cl. .................................... 315/101; 315/172; 315/272; 315/105

[58] Field of Search ............... 315/101, 102, 105, 106, 315/172, 174, 272, 39.51; 219/10.55 B; 363/19, 131; 323/222; 331/112

[56] References Cited

U.S. PATENT DOCUMENTS

| | | | |
|---|---|---|---|
| 3,392,309 | 7/1968 | Hickman | 315/105 |
| 3,651,371 | 3/1972 | Tingley | 315/102 |
| 3,902,099 | 8/1975 | Feinberg | 315/105 |
| 4,318,165 | 3/1982 | Kornrumpf et al. | 219/10.55 B |
| 4,882,663 | 11/1989 | Nilssen | 219/10.55 B |

OTHER PUBLICATIONS

Bulliard et al, "Light-Operated Solid State Switch for Pulsed Microwave Power Generator," *Rev. Sci. Instrum.*, Nov. 1980, pp. 1571–1572.

*Primary Examiner*—Eugene R. LaRoche
*Assistant Examiner*—Michael B. Shingleton

[57] ABSTRACT

In a microwave oven, a magnetron is powered by way of a self-oscillating flyback converter circuit, which operates at a conversion frequency controllable over a range of frequencies up to about 35 kHz. The converter circuit is powered from a DC voltage derived from full-wave-rectification and filtering of ordinary 120 Volt/60 Hz power line voltage. The output of the converter is applied to the magnetron by way of a flyback transformer.

In one preferred configuration, the output fromthe flyback transformer is applied dirrectly to the magnetron—without the use of an intermediary rectifier. As a result, current to the magnetron is provided inthe form of triangularly-shaped pulses with a duty-cycle of about 60% and with a crest-factor of less than 3.5.

In a second preferred configuration, the output from the flyback transformer is rectified and filtered by a capacitor-inductor combination, with the result of providing a nearly constant-magnitude current to the magnetron.

7 Claims, 2 Drawing Sheets

FLYBACK CONVERTER MICROWAVE OVEN POWER SUPPLY

BACKGROUND OF THE INVENTION

1. Field of Invention

The present invention relates to inverter-type or flyback converter-type magnetron power supplies for microwave ovens.

2. Prior Art

Power-line-operated electronic inverter-type magnetron power supplies have been previously described, such as in U.S. Pat. No. 3,973,165 to Hester, or in U.S. Pat. No. 4,002,875 to Kiuchi et al. However, these previously described power supplies have not addressed, let alone resolved, a basic issue associated with the practical application of such power supplies. This basic issue relates to the crest-factor of the current supplied to the magnetron—the crest-factor being the ratio of peak to average current.

It is necessary that the power delivered to the magnetron be delivered with an acceptably good crest-factor; otherwise, the magnetron—due to limits on cathode emissivity and associated moding effects—would not be able to supply the required level of microwave output power.

In particular, for practical reasons, it is necessary that the magnetron be supplied with a current of crest-factor not any poorer than what is presently being provided by most commonly used transformer-type magnetron power supplies; the typical crest-factor of which is about 3.5.

SUMMARY OF THE INVENTION

Objects of the Invention

A first object of the present invention is that of providing a power supply particularly suitable for powering the magnetron in a microwave oven.

A second object is that of providing a particularly cost-effective flyback converter-type power supply for the magnetron in a microwave oven.

A third object is that of providing a power supply operable to provide to the magnetron in a microwave oven a current of particularly low crest-factor.

A fourth object is that of providing for a magnetron a power supply that is particularly cost-effective.

These as well as other important objects and advantages of the present invention will become apparent from the following description.

BRIEF DESCRIPTION

In a microwave oven, a magnetron is powered by way of a self-oscillating flyback converter circuit, which operates at a conversion frequency controllable over a range of frequencies up to about 35 kHz. The converter circuit is powered from a DC voltage derived from full-wave-rectification and filtering of ordinary 120Volt/60Hz power line voltage. The output of the converter is applied to the magnetron by way of a flyback transformer.

In one preferred embodiment, the output from the flyback transformer is applied directly to the magnetron—without the use of an intermediary rectifier. As a result, current to the magnetron is provided in the form of triangularly-shaped pulses with a duty-cycle of about 60% and with a crest-factor of no more than about 3.5.

In a second preferred embodiment, the output from the flyback transformer is rectified and filtered by a capacitor-inductor combination, with the result of providing a nearly constant-magnitude current to the magnetron; which is to say: providing the magnetron with current at a crest-factor not much higher than 1.0.

Means are provided whereby the magnitude of the magnetron current can be controlled.

PROBLEM SITUATION UNDERLYING INVENTION

Figure 1:
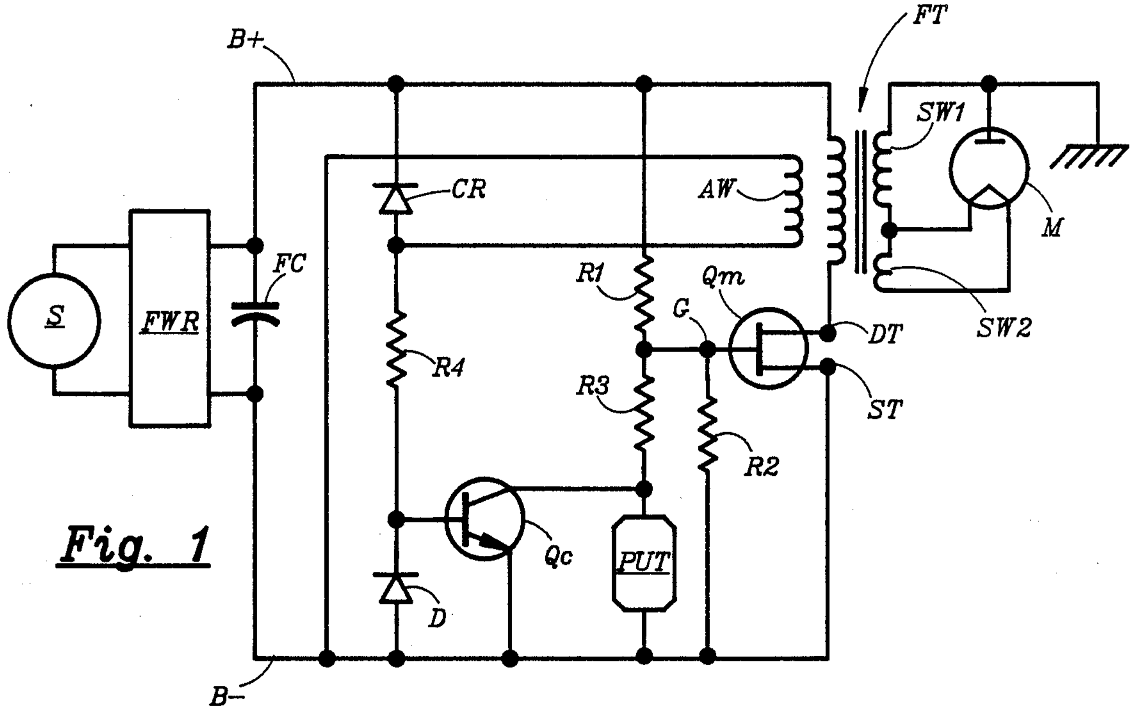
FIG. 1 provides a schematic circuit diagram of the first preferred embodiment of the invention.

The present invention is not aimed at solving any expressly enunciated problems associated with the power supplies presently used in microwave ovens. Rather, it is based on a combination of perceptions and recognitions related to how it may be possible to improve these power supplies to a significant degree. Some of these perceptions and recognitions are identified as follows.

1. As is generally recognized, an inverter-type or flyback converter-type power supply will permit a significant reduction in the weight of the power supply required for powering the magnetron in a microwave oven.

2. As is not generally recognized, there would be significant value associated with improving the crest-factor of the current supplied to the magnetron in a microwave oven. Presently, the crest-factor is typically about 3.5. If it could be significantly reduced, several benefits would result: (i) the problem of moding would be significantly reduced; (ii) magnetron efficiency would be noticeably improved; and (iii) the amount of microwave power available from a given magnetron would increase substantially (or, conversely, a given amount of microwave power could be obtained from a smaller magnetron).

3. As is also not generally recognized, an inverter-type or flyback converter-type power supply can—if carefully and properly designed—significantly improve the crest-factor of the current supplied to the magnetron. However, such power supplies—to the extent they have been described in prior art —have not provided for any improvement of current crest-factor.

4. As is yet also not generally recognized, by powering the magnetron by way of a flyback converter-type power supply, no rectification means is required in the output circuit in that the magnetron may effectively do its own rectification. Such a rectifier-less arrangement is not feasible when using a symmetrically voltage-driven power supply—which is what is done in all known prior art microwave oven power supplies.

5. Also as is not generally recognized, by providing the requisite magnitude-limited current to the magnetron without ever permitting the magnitude of the voltage across the magnetron to significantly exceed its regular operating voltage, moding problems are significant mitigated. In present magnetron power supplies, the magnitude of the voltage provided across the magnetron—in order to attain the requisite current-magnitude-limitation —is substantially higher before the magnetron starts to absorb power than it is after the magnetron has become capable of absorbing power (i.e., after its thermionic cathode has reached full emissivity).

6. By way of a major circuit simplifications, it becomes feasibly possible to provide a cost-effective flyback converter-type power supply suitable for powering the magnetron in a microwave oven. In this connection, it is noted that the currently conventional microwave oven power supplies are presently purchased by manufacturers of microwave ovens at an effective cost of about 3 cents per Watt. On the other hand, the minimum corresponding cost-per-Watt associated with the best of prior art inverter-type and/or flyback converter-type power supplies is presently on the order of 15 cents.

DESCRIPTION OF THE PREFERRED EMBODIMENTS

Details of Construction

FIG. 1 shows an AC voltage source S, which in reality is an ordinary 120Volt/60Hz electric utility power line.

Connected to S is a full-wave rectifier FWR that rectifies the AC voltage from S and provides the rectified current to a filter capacitor FC, wherefrom is provided a substantially constant-magnitude DC voltage between a positive power bus B+and a negative power bus B−.

Connected between the B+ bus and drain terminal DT of a MOSFET Qm is the primary winding of a flyback transformer FT. Source terminal ST of MOSFET Qm is connected with the B− bus.

Transformer FT has a first secondary winding SW1 and a second secondary winding SW2. One terminal of winding SW1 is connected with the anode of a magnetron M; which anode is connected to ground. The other terminal of winding SW1 is connected with one of the terminals of winding SW2. The two terminals of winding SW2 are connected with the two terminals of the thermionic cathode of magnetron M.

Flyback transformer FT has an auxiliary winding AW, one terminal of which is connected with the B− bus, the other terminal of which is connected with the anode of a clamping rectifier CR. The cathode of rectifier CR is connected with the B+ bus.

A first resistor R1 is connected between the B+ bus and gate G of MOSFET Qm and a second resistor R2 is connected between gate G and the B− bus. A third resistor R3 is connected in series with a programmable unijunction transistor PUT to form a series-combination; which series-combination is connected between gate G and the B− bus.

A control transistor Qc is connected with its collector to gate G and with its emitter to the B− bus. A diode D is connected with its cathode to the base of transistor Qc and with its anode to the B− bus. A fourth resistor R4 is connected between the base of transistor Qc and the anode of clamping rectifier CR.

Figure 2:
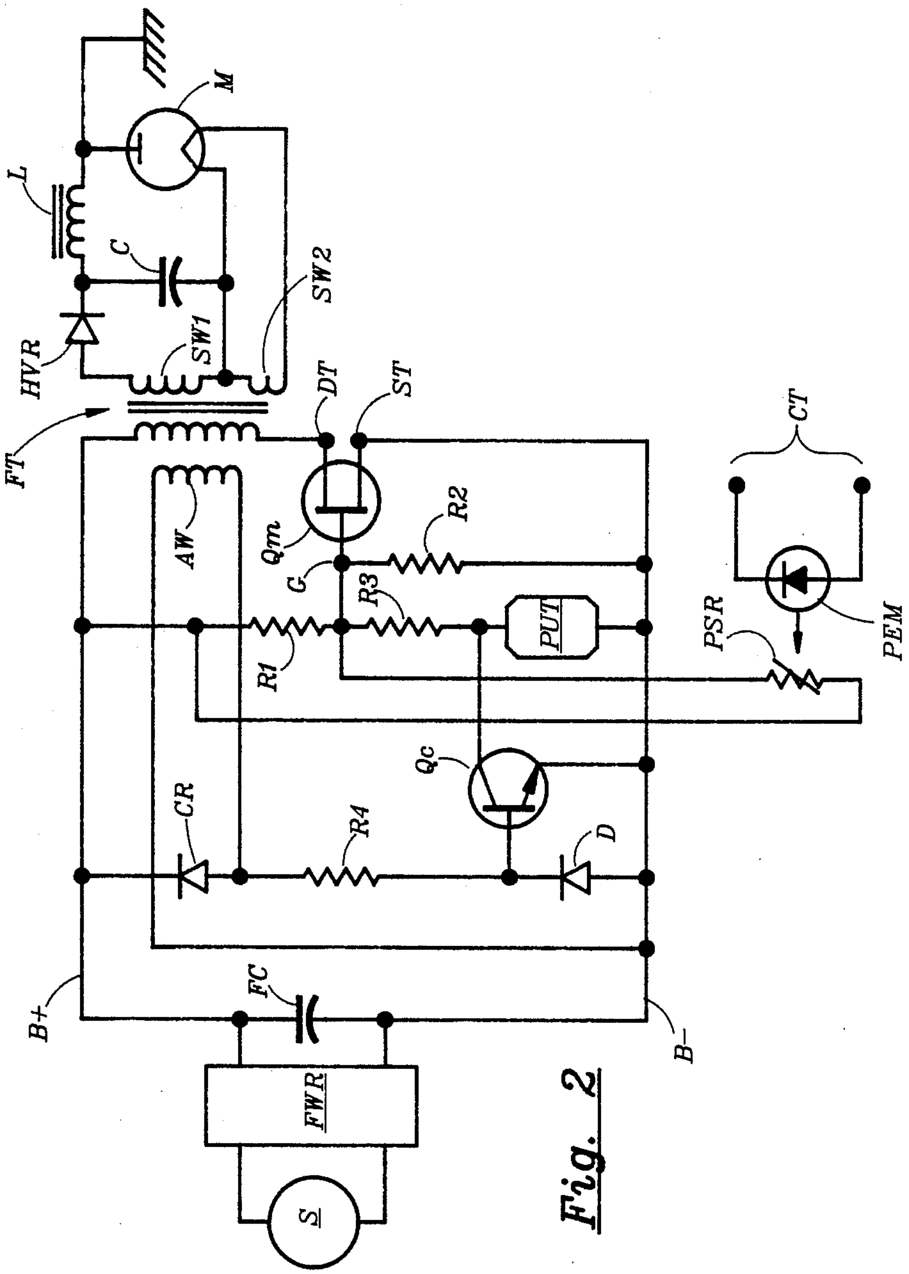
FIG. 2 provides a schematic circuit diagram of the second preferred embodiment.

The circuit of FIG. 2 is identical to that of FIG. 1 except in two respects.

First, a photo-sensitive resistor PSR is connected in parallel with resistor R1; and this photo-sensitive resistor is placed near to and in photo-responsive relationship with a photo-emitting means PEM, which is connected with and actuated from a pair of control terminals CT.

Second, between the terminals of winding SW1 and magnetron M are interposed: (i) a high voltage rectifier HVR having its anode connected with one of the terminals of winding SW1, (ii) a capacitor C connected between the cathode of rectifier HVR and the other terminal of winding SW1, and (iii) an inductor L connected between the cathode of rectifier HVR and the anode of magnetron M.

EXPLANATION OF WAVEFORMS

FIG. 3*a* shows the waveform of the voltage at gate G of MOSFET Qm as observed with reference to the B− bus.

FIG. 3*b* shows the corresponding voltage at drain terminal DT of the MOSFET.

FIG. 3*c* shows the corresponding current flowing through the primary winding of transformer FT and into drain terminal DT of the MOSFET.

FIG. 3*d* shows the corresponding current flowing out from first secondary winding SW1 and into the anode of magnetron M.

DESCRIPTION OF OPERATION

The operation of the power supply arrangement of FIG. 1 may be explained as follows.

In FIG. 1, after having been connected with the power line, a substantially constant-magnitude DC voltage exists between the B+ bus and the B− bus. As a result of this DC voltage, a unidirectional current flows through resistor R1 (about 20 kOhm) and into the capacitance (about 3600 pF) of gate G, thereby causing the voltage on the gate to rise in a substantially linear manner. (The value of R2 is about 1.0 megOhm and has negligible effect on the circuit's operation as herein relevant.)

As the magnitude of the gate voltage rises—assuming a starting point of near-zero voltage—the MOSFET (Motorola type MTM15N40) will soon become conductive (after 2 micro-seconds or so and at about 3.5 Volt), and current will start to flow through the primary winding of flyback transformer FT.

The magnitude of the gate voltage will keep on rising until it reaches a magnitude (just under 20 Volt) at which the PUT (programmable unijunction transistor 2N6027 from General Electric) will break down and become conductive, thereby effectively placing resistor R3 (about 12 Ohm) in shunt between the gate and source terminal ST; which, in turn causes the gate capacitance to discharge, thereby bringing the magnitude of the gate voltage back down to near-zero.

As long as the MOSFET existed in a conductive state, substantially the full B+ voltage was applied across the primary winding of the flyback transformer; which transformer has a substantial built-in inductance; which, in turn, is to say that the transformer must have an air-gap. In other words, during this MOSFET's ON-period, the magnitude of the voltage on the drain terminal (DT) is near-zero when referenced to the source terminal (ST) or the B− bus.

As long as the B+ voltage is present across this primary winding, energy becomes stored in the inductance of the transformer; and at the end of the MOSFET conduction period—i.e., at the point just before the MOSFET ceases to conduct—the energy stored is equal to the amount of energy needed by the magnetron for each cycle of the inverter. Thus, at an inversion frequency of 33 kHz and a magnetron power requirement of 800 Watt, the energy required per inversion cycle (or per flyback cycle) is about 24 milli-Joule; which is to say that the energy that must be stored in the inductance of the flyback transformer at the end of the period of the MOSFET being conductive, must be about 24 milli-Joule. (With a B+ voltage of 150 Volt, this implies that the magnitude of the current flowing through the MOSFET just prior to turn-off is on the order of about 16 Ampere, assuming an effective MOSFET ON-period of about 10 micro-seconds per cycle.)

With inductive energy stored in the flyback transformer, and with the gate voltage reduced to near-zero—thereby switching OFF the MOSFET—the voltage on the drain terminal (DT) rises to the point of becoming limited by whatever might be loading the transformer. Under normal operating conditions, this loading would be due to the magnetron.

The voltage transformation ratio of the flyback transformer is so arranged that the magnitude of the reverse-voltage resulting across the primary winding of the flyback transformer (during the period when the stored-up energy discharges itself into the magnetron) is about 85 Volt. As a necessary consequence, it takes about 18 micro-seconds for the inductive energy in the flyback transformer to discharge itself into the magnetron.

According to above considerations, just after the point is reached at which the PUT breaks down and causes the magnitude of the gate voltage to drop to near-zero (thereby switching the MOSFET into a non-conductive state), the magnitude of the voltage on the drain terminal (DT) increases from near-zero to about 85 Volt higher than the B+ voltage; which, due to the chosen primary-to-auxiliary turns-ratio, makes the magnitude of the voltage across auxiliary winding AW about 60 Volt.

With 60 Volt present at the point to which resistor R4 is connected with the anode or rectifier CR, current starts flowing into the base of transistor Qc, which therefore will become conductive, thereby preventing the voltage on the gate of the MOSFET from rising as long as the inductive energy in the flyback transformer is being discharged (i.e., for as long as the 60 Volt is present).

As soon as the inductive energy has been completely discharged, the magnitude of the voltage feeding resistor R4 falls to near-zero; and transistor Qc now ceases to conduct. At this point, the MOSFET gate voltage starts rising again (at a rate of about 2 Volt per micro-second); and, about 2 micro-seconds later, the gate voltage will have reached a magnitude (4 Volt) large enough to cause the MOSFET once more to start conducting; from which point the cycle repeats.

With transformer winding polarities as indicated, the magnetron will conduct during the period when the flyback transformer discharges its energy. However, being in effect an electronic diode, the magnetron does not conduct (between its cathode and anode) during the period when the flyback transformer is being charged up. During that time, it only draws the relatively modest level of power associated with heating the cathode.

During the short period before the magnetron is operable to represent an effective load to the flyback transformer—i.e., while the thermionic cathode is in the process of becoming incandescent—most of the energy stored in the flyback transformer will be discharged back into filter capacitor FC by way of clamping rectifier CR. During this mode of operation, the voltage present across the auxiliary winding must by necessity be equal to the B+ voltage (i.e., about 150 Volt).

The operation of the circuit arrangement of FIG. 2 is in most respects identical to that of FIG. 1. However, in addition to the obvious differences associated with the filtering of the magnetron current and the control provided by the photo-sensitive resistor (PSR) and the photo-emitting means (PEM), a few changes in timing and turns-ratios have been made.

In FIG. 2, the MOSFET ON-time has been increased to about 13 micro-seconds; and the MOSFET OFF-time has been decreased to about 15 micro-seconds (which still leaves a dead period of about 2 micro-seconds). Also, as a necessary corollary, the voltage present across the auxiliary winding during the discharge of the inductive energy from the flyback transformer has been increased from 85 Volt to about 130 Volt.

As additional consequences of these different values of MOSFET ON-time and OFF-time, the peak MOSFET drain current is reduced from 16 Ampere to about 13 Ampere, and the magnitude of the maximum voltage presented to the magnetron is now limited to being only about 15% higher than that of its normal operating voltage.

The operation of the control arrangement consisting of the photo-sensitive resistor and the photo-emitting means is explained as follows.

With no light provided by the photo-emitting means, the resistance of the photo-sensitive resistor is very high in comparison with that of R1; which means that the control arrangement has no effect under this condition, and that the magnetron now receives its maximum flow of power. However, as light is provided to PSR (as emitted from PEM—which, in turn, results from current provided to control terminals CT) its resistance decreases, thereby giving rise to a shortening of the time it takes for the capacitance of the MOSFET gate to charge to a given voltage level.

Thus, with light provided to the photo-sensitive resistor, the MOSFET ON-time is shortened; which implies that the power provided to the magnetron will be reduced.

In this connection, it should be noted that—while flyback conversion frequency will increase essentially as a linear function of shortened ON-time—the energy stored and transferred to the magnetron per cycle will decrease as a square function of the shortening of the ON-time; which explains the reason why the net power provided to the load will decrease substantially in linear relationship with the decreased ON-time.

Control current to control terminals CT may be provided by way of any one of several suitable control arrangements. For instance, CT may be connected in series with an adjustable resistor; and this series-combination may be connected between the B+ bus and the B− bus—with the cathode of photo-emitting diode PEM being connected with the B− bus. Then, by way of the adjustable resistor, the amount of power provided to the magnetron may be adjusted.

Figure 3:
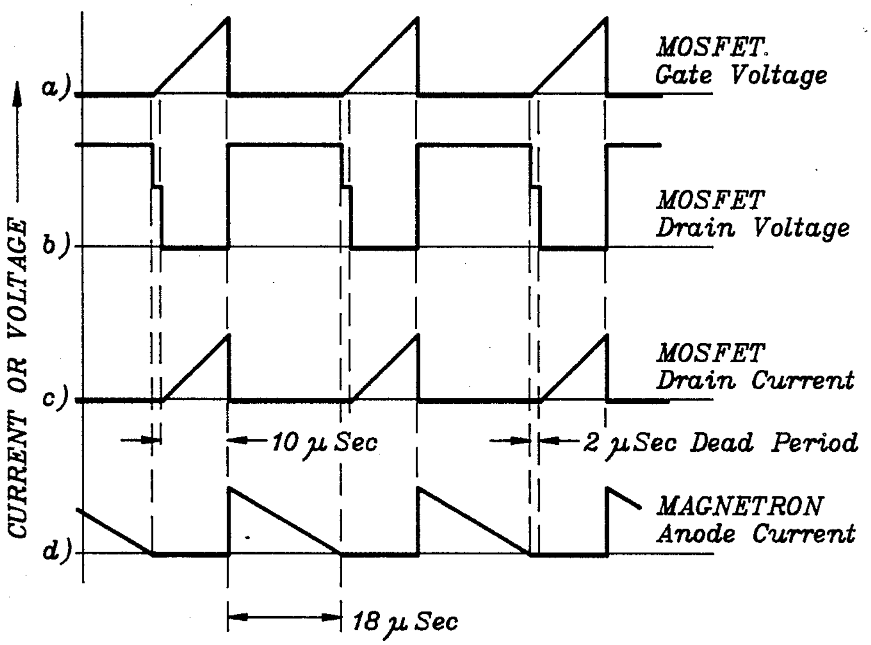
FIG. 3 shows voltage and current waveforms associated with the both embodiments.

ADDITIONAL COMMENTS (a) The waveforms of FIG. 3 are principally relevant in connection with the circuit arrangement of FIG. 1. However, except for the waveform of FIG. 3*d* and for the somewhat different proportioning of MOSFET ON-times versus OFF-times, they are also applicable to the circuit arrangement of FIG. 2.

(b) Under some circumstances it may be unacceptable or undesirable to subject the magnetron to high-magnitude reverse voltages, as indeed occurs in the arrangement of FIG. 1. To prevent this from taking place, it is only necessary to interpose a rectifier between the output of secondary winding SW1 and the anode of the magnetron. In that situation, as an additional precaution, a high-value resistor may be used for shunting the magnetron.

(c) There are several simple ways by which the 2 micro-second dead period (see FIG. 3) may be substantially eliminated. For instance, by the use of a Zener diode connected in series between the emitter of transistor Qc and the B− bus, and by having the one terminal of the PUT connected with this emitter rather than with the B− bus, it is readily possible to assure that the MOSFET gate capacitance never gets discharged further than necessary to assure complete MOSFET turn-off. With most presently common MOSFETS, this would imply the use of a Zener diode with a Zener voltage of about 3 Volt.

(d) Due to the filtering by capacitor C and inductor L in the circuit arrangement of FIG. 2, the anode current provided to the magnetron in that arrangement becomes continuous and substantially constant in magnitude. In contrast with the situation associated with relatively low-frequency magnetron supply power (i.e., 60 Hz), when the magnetron is provided with relatively high-frequency supply power (i.e., 30 kHz), filtering of the voltage/current supplied to the magnetron may be effectively accomplished by components of relatively modest size, weight and cost.

(e) It is emphasized that the term "magnetron" as used herein refers to the type of magnetron used in presently ordinary microwave ovens. Thus, a magnetron in the context of the present invention refers to a magnetron having its own built-in permanent magnet for creating its requisite internal magnetic field; which implies that it has no requirements for, nor any facilities for, receiving an externally supplied magnetization current.

(f) Clearly, the circuit arrangement of FIG. 1 may be used with the control arrangement of FIG. 2; or, conversely, the circuit arrangement of FIG. 2 may be used without the L-C output filter means. Thus, with the control arrangement of FIG. 2 used in the circuit of FIG. 1, the resulting magnetron anode current will be adjustable in magnitude. However, this adjustment is accomplished without interruption of the flow of anode current pulses. Rather, the frequency and/or the magnitude of the pulses will be affected. Thus, power supplied to the magnetron is controlled without the need for periodically interrupting the flow of current pulses to the magnetron.

(g) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
a source of DC voltage;
a magnetron having a high-voltage DC input;
power supply means connected with the source and operable to provide unidirectional current pulses to a high-voltage DC output; and
filter means connected between the high-voltage DC output and the high-voltage DC input, thereby to provide to this high-voltage DC input a unidirectional current of substantially constant magnitude.

2. The arrangement of claim 1 wherein the filter means comprises inductor means.

3. The arrangement of claim 1 wherein the magnitude of the unidirectional current provided to the high-voltage DC input is approximately proportional to the magnitude of the DC voltage.

4. An arrangement comprising:
a source of DC voltage;
energy-storing inductor means;
electronic switching means having a pair of power terminals and a control input;
interconnect means operative to connect together the source of DC voltage, the energy-storing inductor means, and the power terminals of the electronic switching means in such manner that the electronic switching means is operative to control the application of DC voltage to the inductor means in response to a control voltage provided at the control input, thereby to cause a current to flow between the power terminals of the electronic switching means;
control means connected with the control input and operative to provide the control voltage; which control voltage is characterized as having a magnitude approximately proportional to that of the current flowing between the power terminals; and
a magnetron connected in circuit with the inductor means by way of voltage transformation and rectification means, thereby to be powered at least in part by energy sometimes stored within the inductor means.

5. An arrangement comprising:
a source of DC voltage;
a magnetron having a high-voltage DC input;
power supply means connected with the source and operable to provide unidirectional current pulses to a high-voltage DC output, the power supply means having control means operative to control the magnitude of these unidirectional current pulses in response to a control input received at a set of control terminals;
connect means operative to provide connection between the high-voltage DC output and the high-voltage DC input, thereby to provide a unidirectional current to the magnetron; this unidirectional current being of substantially continuous nature, having no periods of zero magnitude; and
adjustment means connected with the control terminals and operative to provide the control input, thereby to permit adjustment of the magnitude of the unidirectional current provided to the magnetron.

6. An arrangement comprising:
a source of DC voltage;
a magnetron having a high-voltage DC input;
power supply means connected with the source and operable to provide unidirectional current pulses to a high-voltage DC output, the power supply means having control means operative to control the frequency of these unidirectional current pulses in response to a control input received at a set of control terminals;
connect means operative to provide connection between the high-voltage DC output and the high-voltage DC input, thereby to provide a unidirectional current to the magnetron, the magnitude of this unidirectional current being a function of the frequency of the unidirectional current pulses; and adjustment means connected with the control terminals and operative to provide the control input, thereby to permit adjustment of the magnitude of the unidirectional current provided to the magnetron.

7. An arrangement comprising:

a source of DC voltage;

a magnetron having a high-voltage DC input;

power supply means connected with the source and operable to provide unidirectional current pulses to a high-voltage DC output; the power supply means having semiconductor switch means operative to alternate periodically between an ON-state and an OFF-state; the ON-state being a state wherein the semiconductor switch means is operative to permit the flow of current; the OFF-state being a state in which the semiconductor switch means is operative to prevent the flow of current; each one of the unidirectional current pulses occurring during a period when the semiconductor switch means exists in its OFF-state; and filter means connected between the high-voltage DC output and the high-voltage DC input, thereby to provide a unidirectional current to the magnetron; this unidirectional current flowing during those periods when the semiconductor switch means exists in its OFF-state as well as, at least in part, during those periods when the semiconductor switch means exists in its ON-state.

* * * * *